(12) United States Patent
Lou (10) Patent No.: US 12,467,954 B2
(45) Date of Patent: Nov. 11, 2025

(54) PROBE CARD DEVICE

(71) Applicant: teCat Technologies (Suzhou) Limited, Suzhou (CN)

(72) Inventor: Choon Leong Lou, Singapore (SG)

(73) Assignee: TECAT TECHNOLOGIES (SUZHOU) LIMITED, Suzhou (CN)

( * ) Notice: Subject to any disclaimer, the term of this patent is extended or adjusted under 35 U.S.C. 154(b) by 148 days.

(21) Appl. No.: 18/537,972

(22) Filed: Dec. 13, 2023

(65) Prior Publication Data
US 2025/0110154 A1 Apr. 3, 2025

(30) Foreign Application Priority Data
Sep. 28, 2023 (CN) .......................... 202311277213.4

(51) Int. Cl.
  *G01R 1/073* (2006.01)
  *G01R 1/04* (2006.01)
  *G01R 1/067* (2006.01)

(52) U.S. Cl.
  CPC ..... *G01R 1/07371* (2013.01); *G01R 1/06772* (2013.01)

(58) Field of Classification Search
  CPC . G01R 1/02; G01R 1/04; G01R 1/067; G01R 1/073; G01R 31/02
  See application file for complete search history.

(56) References Cited

U.S. PATENT DOCUMENTS

| 10,928,422 B2 * | 2/2021 | Kim ................... G01R 1/07371 |
| 2008/0054918 A1 * | 3/2008 | Lin .................... G01R 1/06772 324/756.03 |

\* cited by examiner

*Primary Examiner* — Neel D Shah
(74) *Attorney, Agent, or Firm* — Li & Cai Intellectual Property (USA) Office (57) ABSTRACT

A probe card device is provided. The probe card device includes at least one first guide plate, at least one second guide plate, at least one probe, and a plurality of grounding elements. The first guide plate has a plurality of first array through holes and the second guide plate has a plurality of second array through holes. The plurality of grounding elements pass through the first array through holes and the second array through holes. A conductive trace is arranged around at least one first array through hole with the grounding elements to form a first grounding point, the conductive trace is arranged around at least one second array through hole with the grounding elements to form a second grounding point, at least two first grounding points or at least two second grounding points are connected to each other through the conductive trace.

13 Claims, 8 Drawing Sheets

PROBE CARD DEVICE

CROSS-REFERENCE TO RELATED PATENT APPLICATION

This application claims the benefit of priority to Patent Application No. 202311277213.4, filed on Sep. 28, 2023 in People's Republic of China. The entire content of the above identified application is incorporated herein by reference.

FIELD OF THE DISCLOSURE

The present disclosure relates to a probe card device, in particular to a probe card structure that shortens the distance between signal probes and grounding elements.

BACKGROUND OF THE DISCLOSURE

The electrical testing of integrated circuit chips (IC chips) is very important in the manufacturing process. When testing integrated circuits, the testing equipment contacts the device under test through a probe card device to transmit electrical signals. The testing equipment then analyzes the received electrical signals to perform electrical testing. To determine whether the manufacturing quality of the object under test is qualified.

In the prior art, a probe card device includes a signal probe and a guide plate. One end of the signal probe contacts the electrode, and another end of the signal probe contacts the device under test for electrical testing. In high-speed or high-frequency signal testing, grounding elements will be installed to keep the signal transmission of the signal probe stable and reduce interference. However, in the prior art, the distance between the grounding element on the probe card device and the probe is usually too far.

Therefore, how to shorten the distance between the grounding point of the grounding elements and the devices under test through the improvements of structural design has become an important issue to be solved in this field.

SUMMARY OF THE DISCLOSURE

The problem solved by the present disclosure is to provide a probe card device to reduce the distance between the grounding points of the grounding element and the device under test in view of the shortcomings of the existing technology.

To solve the above problem, the present disclosure provides a probe card device, which includes at least one first guide plate, at least one second guide plate, and at least one high-frequency test probe set, the high-frequency test probe set including at least one signal probe, and a plurality of grounding elements. The at least one first guide plate is provided with a plurality of first array through holes. The least one second guide plate is disposed below and parallel to the at least one first guide plate, and the at least one second guide plate is disposed with a plurality of second-array through holes, the plurality of first-array through holes correspond to the plurality of second-array through holes. The at least one signal probe correspondingly passes through one part of the plurality of first array through holes and one part of the plurality of second array through holes. The plurality of grounding elements correspondingly passes through another part of the plurality of first array through holes and another part of the plurality of second array through holes. A conductive trace is provided around the another part of the plurality of first array through holes or the another part of the plurality of second array through holes through which the plurality of grounding elements pass, and at least one grounding point is formed between at least two of the plurality of grounding elements and the conductive trace, and the at least two of the plurality of grounding elements are electrically connected to each other through the conductive trace.

In certain embodiments, the at least one signal probe is correspondingly not electrically connected to the plurality of grounding elements.

In certain embodiments, the another part of the plurality of first array through holes through which the plurality of grounding elements pass are correspondingly adjacent to the one part of the plurality of first array through holes through which the at least one signal probe passes, and the another part of the plurality of second array through holes through which the plurality of grounding elements pass are correspondingly adjacent to the one part of the plurality of second array through holes through which the at least one signal probe passes.

In certain embodiments, among the plurality of grounding elements defining the shielding space, only one of the plurality of grounding elements is used for grounding.

One of the beneficial effects of the present disclosure is that, in probe card device provided by the present disclosure by virtue of the first array through holes and the second array through holes through which the plurality of grounding elements pass are correspondingly adjacent to the one part of the plurality of first array through holes and the second array through holes through which the at least one signal probe passes, and a conductive trace is arranged around at least one first array through holes through which the grounding elements pass to form a first grounding point, the conductive trace is arranged around at least one second array through holes through which the grounding elements pass to form a second grounding point, at least two of the first grounding points are connected to each other through the conductive trace or at least two of the second grounding points are connected to each other through the conductive trace. By virtue of such technical features, the distance between the grounding points of the grounding element and the device under test can be shorten, resulting in high-speed transmission of electronic signals and better current distribution.

Another beneficial effects of the present disclosure is that, in probe card device provided by the present disclosure by virtue of the first array through holes and the second array through holes through which the four grounding elements pass are correspondingly diagonal to the one part of the plurality of the first array through holes and the second array through holes through which the signal probes pass, resulting in good shielding effect and accurate test signal transmit.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 4C is a schematic cross-sectional view of a fifth embodiment of the probe card device of the present disclosure;

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

First Embodiment

Referring to FIG. 1 to FIG. 4F, a first embodiment of the present disclosure provides a probe card device 100, which includes: at least one first guide plate 102, at least one second guide plate 103, and at least one high-frequency test probe set. The high-frequency test probe set includes at least one signal probe 106 and a plurality of grounding elements 105. The plurality of grounding elements 105 define a shielding space, and the shielding space surrounds the signal probe 106. It should be noted that, a quantity of the first guide plate 102 and a quantity of the second guide plate 103 of the present disclosure can be adjusted according to particular implementations. All embodiments of the present disclosure are explained on the premise that the quantity of the first guide plate 102 and the second guide plate 103 is two, respectively. Therefore, the present disclosure does not limit the quantity of the first guide plate 102 and the second guide plate 103. In the first embodiment, the first guide plate 102 is provided with a plurality of first array through holes H1, and the second guide plate 103 is also provided with a plurality of second array through holes H2. The second guide plate 103 is disposed below the first guide plate 102 and parallel to the first guide plate 102. The shapes of the first array through holes H1 and the second array through holes H2 will change according to the shapes of the signal probe 106 and the grounding element 105. The shapes of the first array through holes H1 and the shape of the second array through holes H2 can be circles, squares, rectangles, triangles or polygons. The shapes of the first array through holes H1, the second array through holes H2, the signal probe 106 and the grounding element 105 are not limited in the present disclosure. The plurality of first array through holes H1 may correspond to the plurality of second array through holes H2.

It should be noted that, a plurality of first array through holes H1 and a plurality of second array through holes H2 are respectively arranged in an array on the first guide plate 102 and the second guide plate 103. Specifically, the first array through holes H1 and the second array through holes H2 are arranged in the array at the same spacing distance.

It should be noted that, a quantity of the signal probes 106 in the present disclosure can be adjusted according to particular implementations. All embodiments of the present invention are described on the premise that the quantity of signal probes 106 is one. Thus, the present disclosure does not limit the number of signal probes 106. One end of the signal probe 106 contacts a substrate 104, and another end of the signal probe 106 is electrically connected to the device under test D. The signal probes 106 correspondingly pass through one part of the plurality of first array through holes H1 on the first guide plate 102 and one part of the plurality of second array through holes H2 on the second guide plate 103.

It should be noted that, a quantity of the grounding elements 105 in the first embodiment of the present disclosure can be adjusted according to particular implementations. However, for one signal probe 106, at least two of the grounding elements 105 need to be provided.

The first array through holes H1 through which the grounding elements 105 pass are correspondingly adjacent to the one part of the first array through holes H1 through which the signal probes 106 pass, and the second array through holes H2 through which the grounding elements 105 pass are correspondingly adjacent to the one part of the second array through holes H2 through which the signal probes 106 pass.

In the first embodiments, the first array through holes H1 through which the grounding elements 105 pass are respectively adjacent to different sides (or opposite sides) of the one part of the first array through holes H1 through which the at least one signal probes 106 passes, and the second array through holes H2 through which the grounding elements pass are respectively adjacent to different sides (or opposite sides) of the one part of the plurality of second array through holes H2 through which the at least one signal probe 106 passes.

That is to say, the first array through hole H1 through which one of the two grounding elements 105 passes is located on one side of the first array through hole H1 through which the signal probe 106 passes, and the first array through hole H1 through which another one of the two grounding elements 105 passes is located on another side of the first array through hole H1 through which the signal probe 106 passes. The second array through hole H2 through which one of the two grounding elements 105 passes is located on one side of the second array through hole H2 through which the signal probe 106 passes, and the second array through hole H2 through which another one of the two grounding elements 105 passes is located on another side of the second array through hole H2 through which the signal probe 106 passes.

Figure 1:
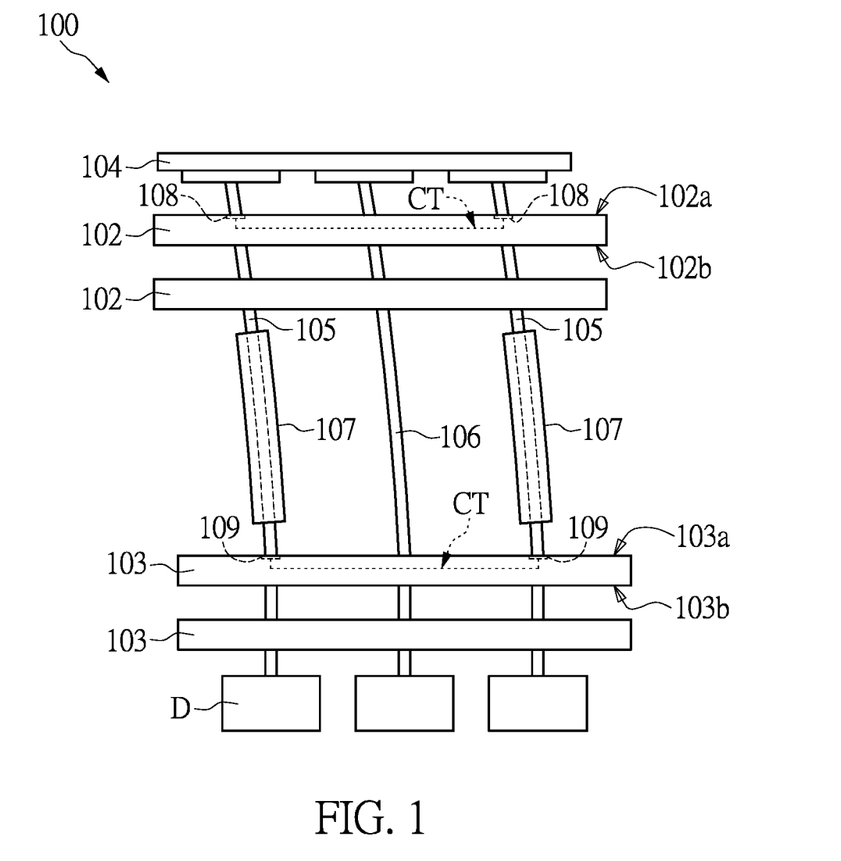
FIG. 1 is a schematic cross-sectional view of a first embodiment of a probe card device of the present disclosure.
Figure 2:
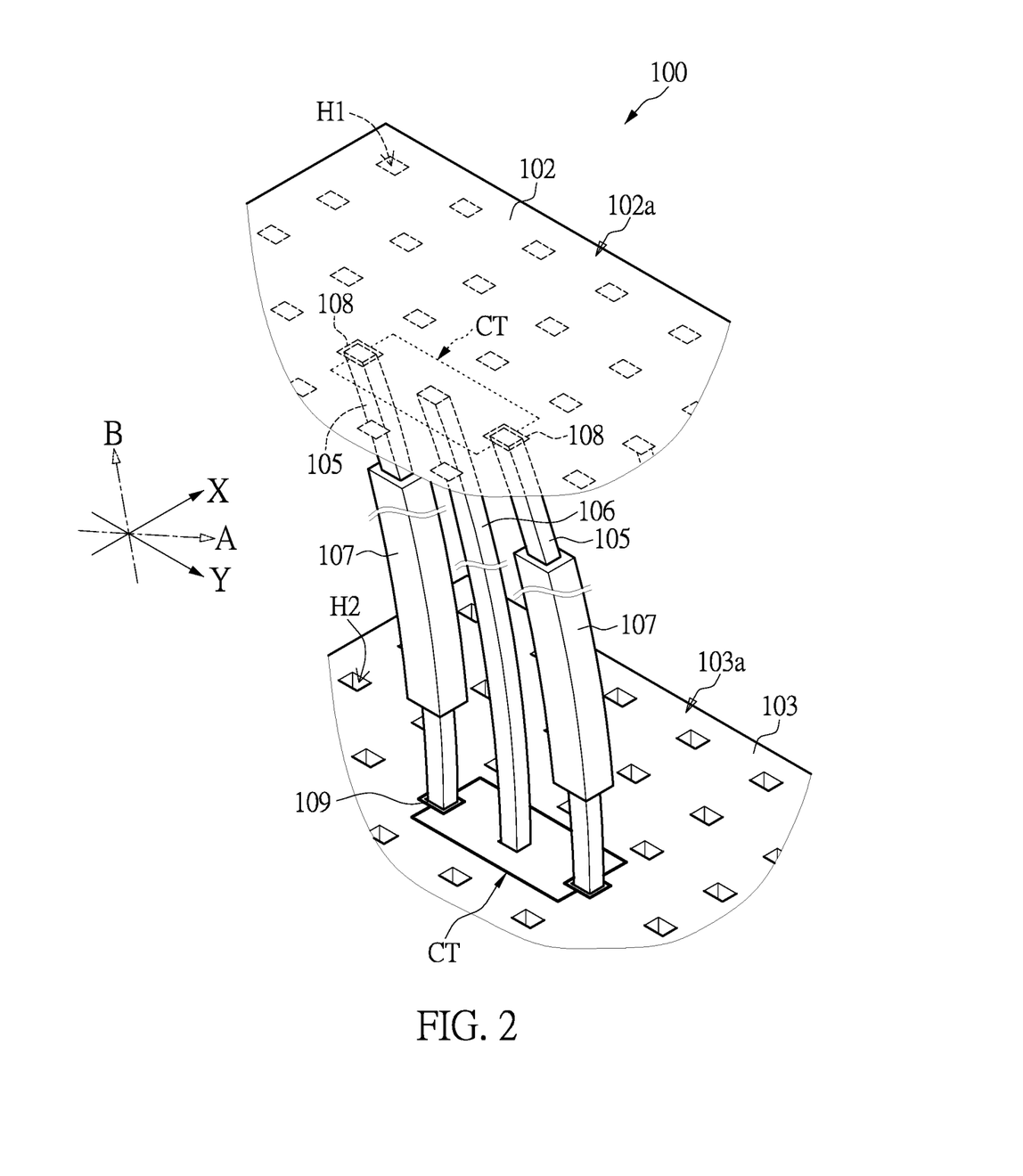
FIG. 2 is a schematic perspective view of the first embodiment of the probe card device of the present disclosure.
Figure 3:
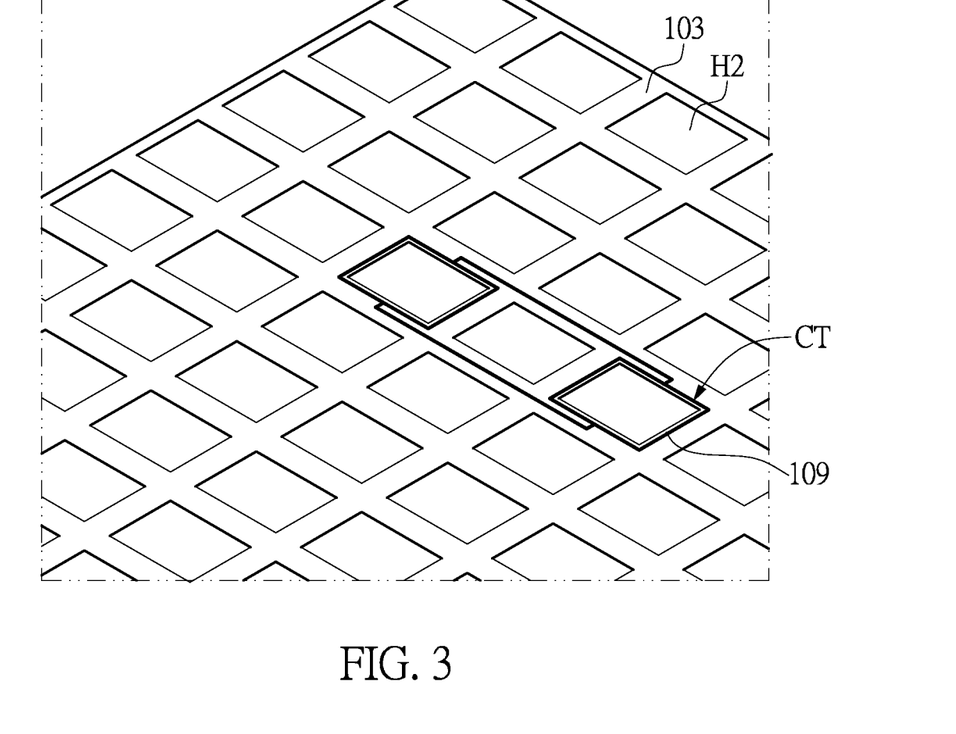
FIG. 3 is a schematic view of the first embodiment of a connection of a conductive trace of the probe card device of the present disclosure.

Referring to FIG. 2, the horizontal plane of the first guide plate 102 and the horizontal plane of the second guide plate 103 respectively have an X-direction axis, a Y-direction axis, an A-direction axis and a B-direction axis. The X-direction axis and the Y-direction axis are perpendicular to each other, the A-direction axis and the B-direction axis are not perpendicular and not parallel to the X-direction axis and the Y-direction axis, and the A-direction axis and the B-direction axis are not parallel to each other.

A conductive trace CT is provided around at least one of the first array through hole H1 through which the grounding elements 105 pass to correspondingly form at least one first grounding point 108, and/or the conductive trace CT is provided around at least one of the second array through hole H2 through which the grounding elements 105 pass to correspondingly form at least one second grounding point 109. The conductive trace CT connects the at least two of the first grounding points 108, or the conductive trace CT connects the at least two of the second grounding points 109.

The plurality of the grounding elements 105 can be electrically connected to each other through the conductive trace CT, and ground conduction is achieved only through one or more grounding elements 105.

The at least one of the first guide plate 102 and the second guide plate 103 is provided with conductive trace CT. It is clearly shown in FIG. 3 that the conductive traces CT are provided on the second guide plate 103. In a specific embodiment, the first guide plate 202 and the second guide plate 203 may be provided with the conductive trace CT at the same time. The present disclosure does not limited thereto.

The conductive trace CT is formed by plating the through holes frame (tray) around the first array through holes H1 or the second array through holes H2 with gold or copper plating.

In one embodiment, the conductive trace CT on the second guide plate 103 connects the two second grounding points 109 through which two grounding elements 105 respectively pass. In one embodiment, the conductive trace CT on the first guide plate 102 connect the two first grounding points 108 through which two grounding elements 105 respectively pass. In one embodiment, the conductive trace CT on the first guide plate 102 connect the two first grounding points 108 through which two grounding elements 105 respectively pass and the conductive trace CT on the second guide plate 103 connect the two second grounding points 109 through which two grounding elements 105 respectively pass. Preferably, as long as there is a conductive trace CT on one of the first guide plate or the second guide plate to connect the grounding points, the shielding effect of the two grounding elements 105 on the signal probe 106 can be achieved.

Preferably, the first guide plate 102 has a first guide plate upper surface 102a and a first guide plate lower surface 102b, and the second guide plate 103 has a second guide plate upper surface 103a and a second guide plate lower surface 103b. The first grounding point 108 is formed on at least one of the first guide plate upper surface 102a and the first guide plate lower surface 102b of the first guide plate, and the second grounding point 109 is formed on at least one of the second guide plate upper surface 103a and the second guide plate lower surface 103b of the second guide plate.

Figure 4A:
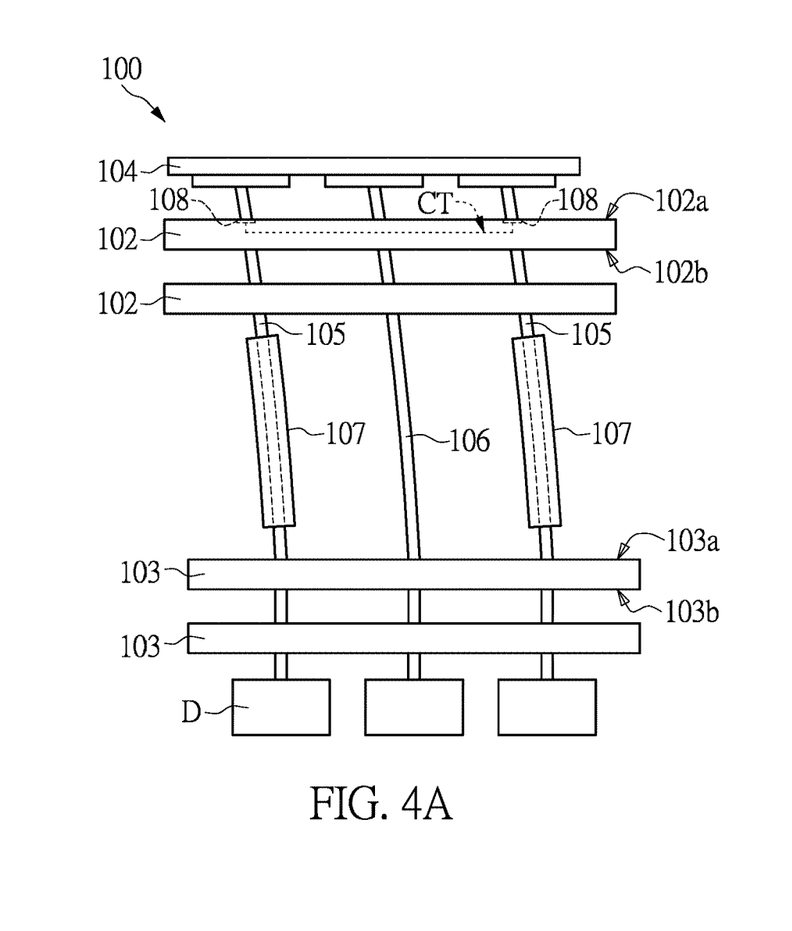
FIG. 4A is a schematic cross-sectional view of a second embodiment of the probe card device of the present disclosure.
Figure 4B:
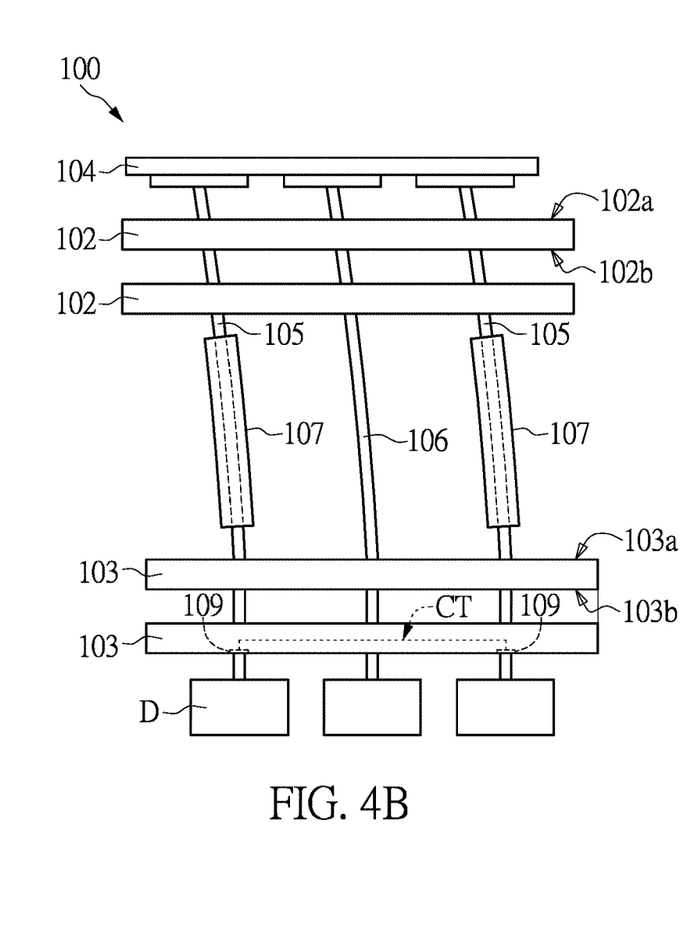
FIG. 4B is a schematic cross-sectional view of a third embodiment of the probe card device of the present disclosure.
Figure 4C:
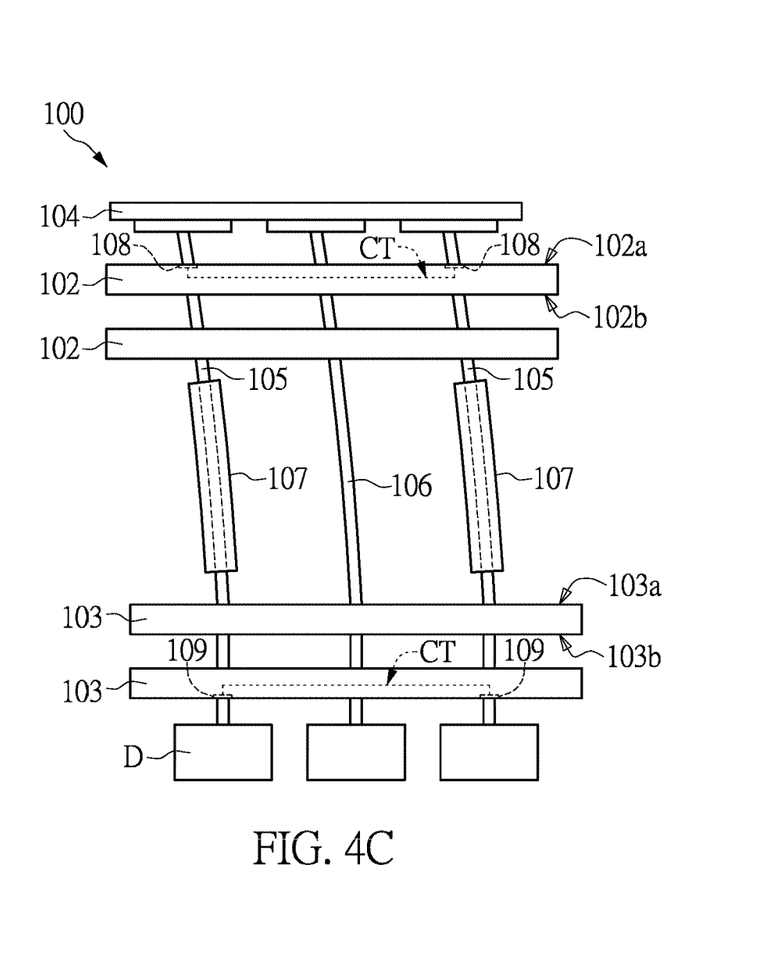
FIG. 4C is a schematic cross-sectional view of a fourth embodiment of the probe card device of the present disclosure.
Figure 4D:
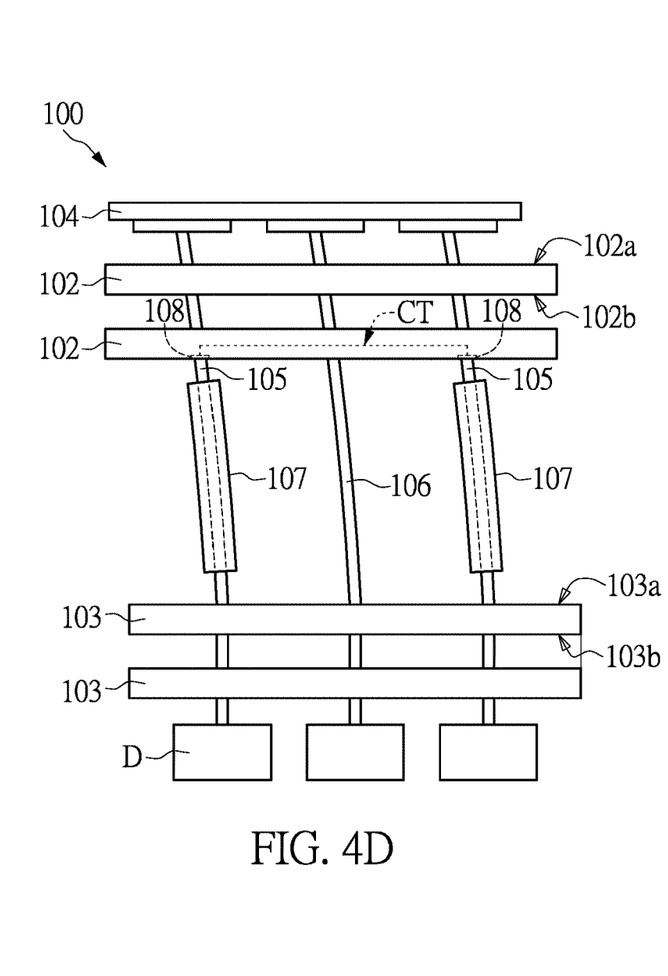
FIG. 4D is a schematic cross-sectional view of a sixth embodiment of the probe card device of the present disclosure.
Figure 4E:
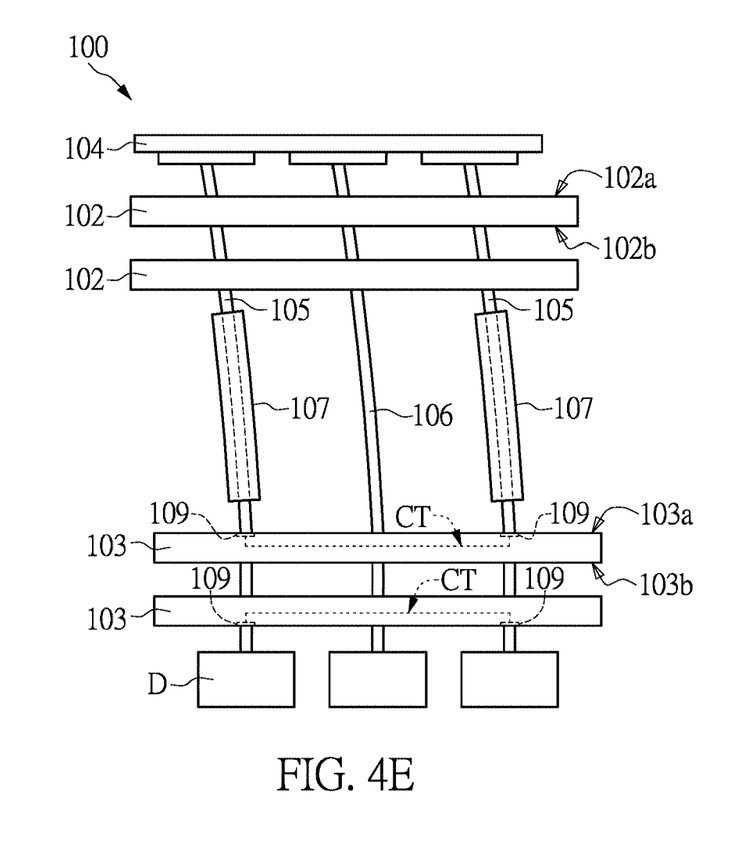
FIG. 4E is a schematic cross-sectional view of a seventh embodiment of the probe card device of the present disclosure.
Figure 4F:
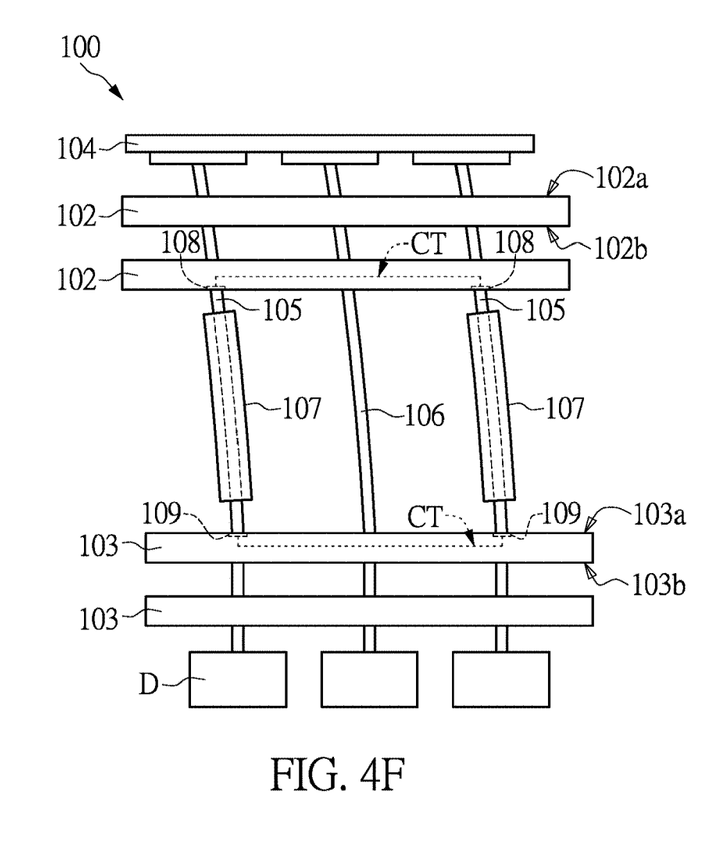

Please refer to FIGS. 4A to 4F. FIGS. 4A to 4F respectively illustrate the situation where the conductive trace CT is disposed on the first guide plate 102 or the second guide plate 103 in different embodiments. In FIG. 4A, it is shown that in the case of two first guide plates 102 and second guide plates 103, the conductive trace CT is only provided on the first guide plate upper surface 102a of the first guide plate 102 that is closer to the substrate 104. In FIG. 4B, it is shown that in the case of two first guide plates 102 and second guide plates 103, the conductive trace CT is only provided on the second guide plate lower surface 103b of the second guide plate 103 that is closer to the device under test. In FIG. 4C, it is shown that in the case of two first guide plates 102 and second guide plates 103, the conductive trace CT is only provided on the first guide plate upper surface 102a of the first guide plate 102 that is closer to the substrate 104 and on the second guide plate lower surface 103b of the second guide plate 103 that is closer to the device under test D. In FIG. 4D, it is shown that in the case of two first guide plates 102 and second guide plates 103, the conductive trace CT is only provided on the lower surface 102b of the first guide plate 102 that is far away from the substrate 104. In FIG. 4E, it is shown that in the case of two first guide plates 102 and second guide plates 103, the conductive trace CT is only provided on the second guide plate upper surface 103a of the second guide plate 103 that is far away from the device under test D and on the lower surface 103b of the second guide plate 103 that is closer to the device under test D. In FIG. 4F, it is shown that in the case of two first guide plates 102 and a second guide plate 103, the conductive trace CT is only provided on the lower surface 102b of the first guide plate 102 that is far away from the substrate 104 and on the upper surface 103a of the second guide plate 103 that is far away from the device under test D. However, the arrangement position of the conductive trace CT can be determined according to the actual application situation, and is not limited by the present disclosure.

Preferably, the grounding element 105 is provided with an insulation coating layer 107.

Preferably, the insulation coating layer 107 on the grounding element 105 does not contact the first guide plate 102 and the second guide plate 103.

Preferably, the first guide plate 102 and the first grounding point 108 are integrally formed, and the second guide plate 103 and the second grounding point 109 are integrally formed.

It should be noted that the signal probes 106 are correspondingly not electrically connected to the grounding elements 105.

Second Embodiment

Figure 5:
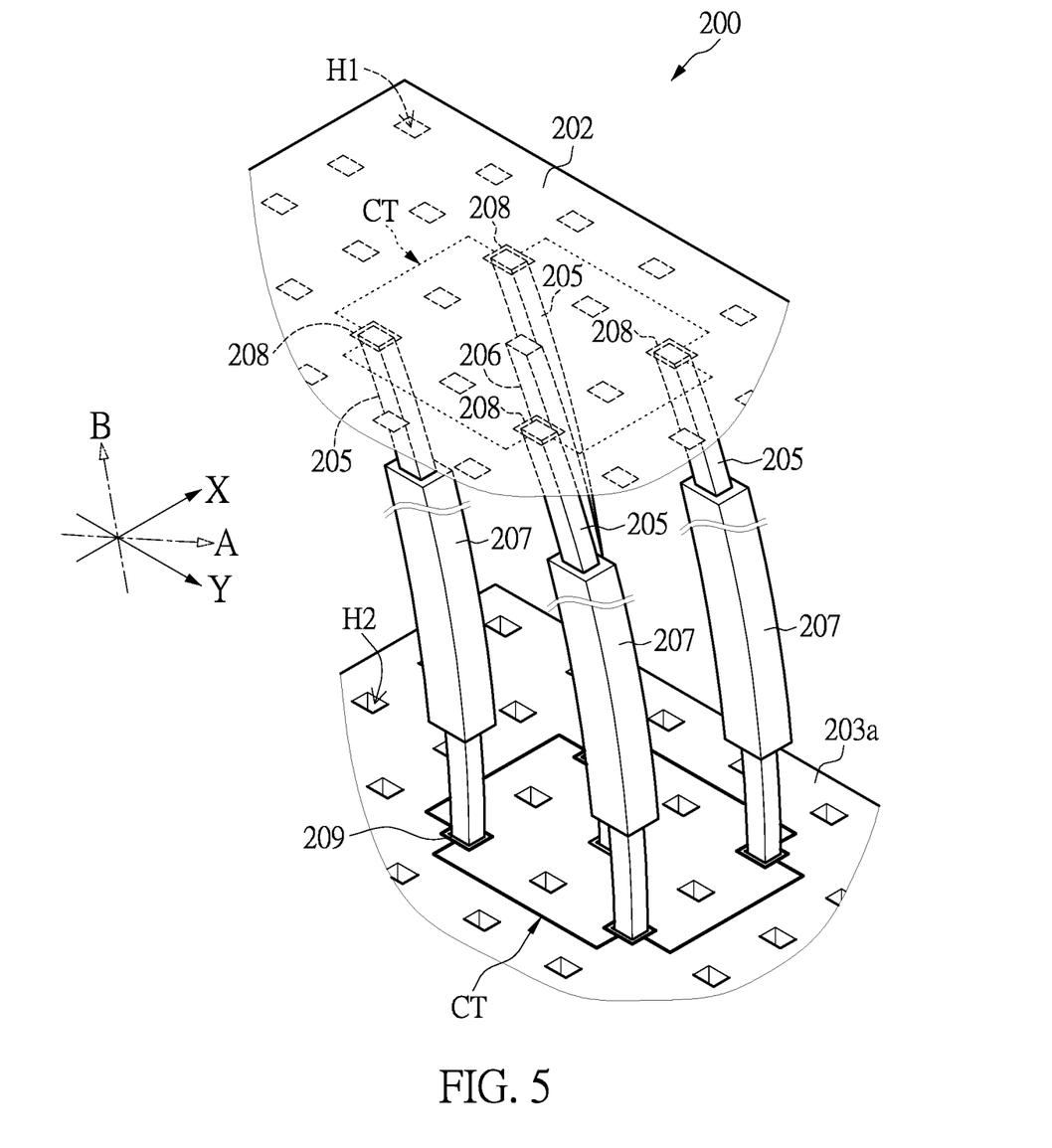
FIG. 5 is a schematic perspective view of the second embodiment of the probe card device of the present disclosure.
Figure 6:
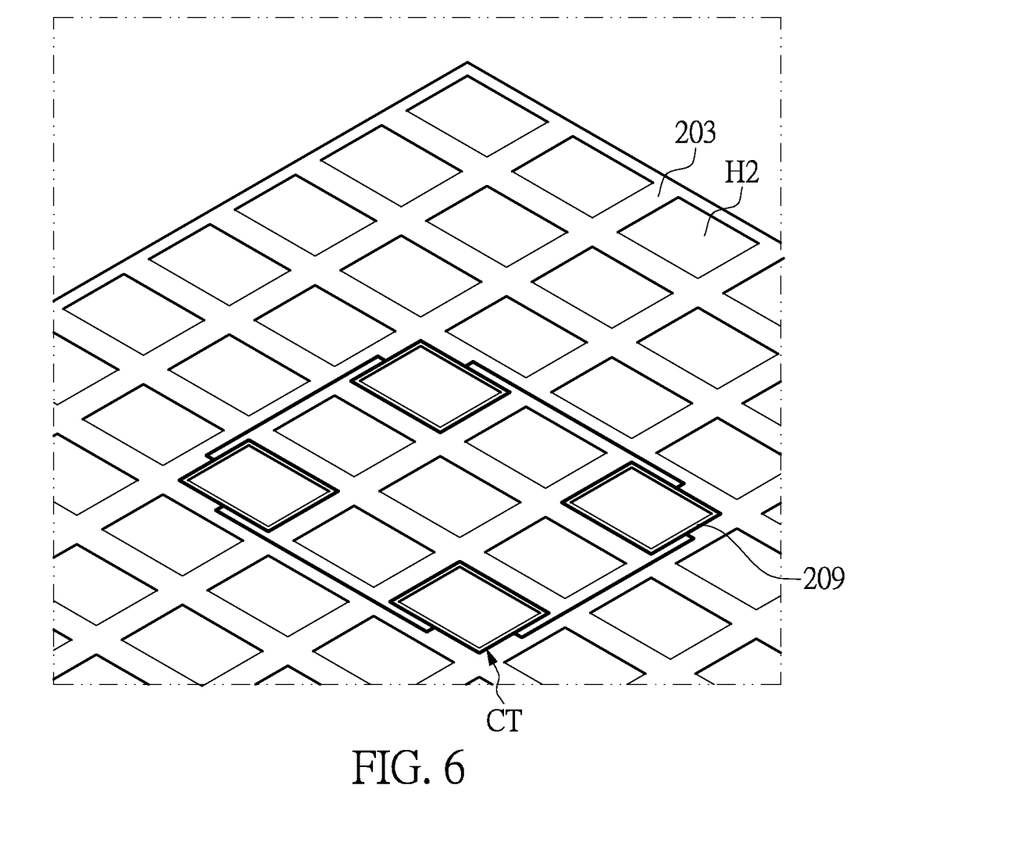
FIG. 6 is a schematic view of the second embodiment of a connection of a conductive trace of the probe card device of the present disclosure.

Referring to FIGS. 5 and 6, which show a probe card device 200 in a second embodiment of the present disclosure. It should be noted that this embodiment is similar to the above-mentioned first embodiment, so the similarities between the two embodiments will not be described again.

The difference between the second embodiment and the first embodiment is that the four grounding elements 205 of the probe card device 200 of the second embodiment are respectively pass through the four first array through holes H1 on the first guide plate 202; the four grounding elements 205 are respectively disposed through the four second array through holes H2 on the second guide plate 203. The four first array through holes H1 through which the four grounding elements 205 pass and the four second array through holes H2 through which the four grounding elements 205 pass are correspondingly diagonal to the one part of the first array through holes H1 through which the signal probe 206 passes and the another part of the second array through holes H2 through which the signal probe 206 passes. The four grounding elements 205 define a shielding space that surrounds the signal probe 206.

That is, take FIG. 5 as an example, in the 3×3 first array through holes H1 (an array consisting of three first array through holes H1 facing the X-axis and three first array through holes H1 facing the Y-axis), the first array through holes H1 through which the signal probe 206 pass is located at a center of the 3×3 first array through holes H1, and four first array through holes H1 will be respectively located at the four diagonal corners of the 3×3 first array through holes H1.

Further, in the second embodiment, the horizontal plane of the first guide plate 202 and the horizontal plane of the second guide plate 203 respectively have an X-direction axis, a Y-direction axis, an A-direction axis and a B-direction axis. The X-direction axis and the Y-direction axis are perpendicular to each other, the A-direction axis and the B-direction axis are not perpendicular and not parallel to the X-direction axis and the Y-direction axis, and the A-direction axis and the B-direction axis are not parallel to each other. In particular, in the second embodiment, the A-direction axis and the B-direction axis take the signal probe 206 as the intersection point. Four grounding elements 205 are respectively pass through four diagonal positions of the signal probe 206 along the A-direction axis and the B-direction axis with respect to the signal probe 206.

In one embodiment, the conductive trace CT is provided around the four first array through holes H1 through which the four grounding elements 205 pass to form four first grounding points 208. The four first grounding points 208 are connected to each other through the conductive trace CT. The conductive trace CT is provided around the four second array through holes H2 through which the four grounding elements 205 pass to form four second grounding points 209. The four second grounding points 209 are connected to each other through the conductive trace CT.

FIG. 6 clearly shows that the conductive trace CT is provided on the second guide plate 203. The conductive trace CT is provided around the four second array through holes H2 through which the four grounding elements 205 pass to form four second grounding points 209. The four second grounding points 209 are connected to each other through the conductive trace CT.

Similarly, an insulation coating layer 207 is provided on the grounding element 205.

Similarly, the insulation coating layer 207 on the grounding element 205 does not contact the first guide plate 202 and the second guide plate 203.

Similarly, the first guide plate 202 and the first grounding point 208 are integrally formed, and the second guide plate 203 and the second grounding point 209 are integrally formed.

Similarly, the signal probes 206 are correspondingly not electrically connected to the grounding elements 205.

In particular, among the plurality of grounding elements and grounding points in the shielding space, grounding may be accomplished by only one of the grounding elements 206.

Through the disposition of the grounding element 205 and the signal probe 206 in the second embodiment of the present disclosure, a shielding effect can be achieved, reducing noise interference and signal distortion, thereby accurately transmitting the test signal.

Beneficial Effects of the Embodiments

One of the beneficial effects of the present disclosure is that, in probe card device provided by the present disclosure by virtue of the first array through holes and the second array through holes through which the plurality of grounding elements pass are correspondingly adjacent to one part of the plurality of first array through holes and the second array through holes through which the at least one signal probe is passed, and a conductive trace is arranged around at least one first array through holes through which the grounding elements pass to form a first grounding point, the conductive trace is arranged around at least one second array through holes through which the grounding elements pass to form a second grounding point, at least two of the first grounding points are connected to each other through the conductive trace or at least two of the second grounding points are connected to each other through the conductive trace. By virtue of such technical features, the distance between the grounding points of the grounding element and the device under test can be shorten, resulting in high-speed transmission of electronic signals and better current distribution.

Another beneficial effects of the present disclosure is that, in probe card device provided by the present disclosure by virtue of the first array through holes and the second array through holes through which the four grounding elements pass are located respectively at the diagonal position of the first array through holes and the second array through holes where the signal probes pass through, resulting in good shielding effect and accurate test signal transmit.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A probe card device, comprising:
   at least one first guide plate, wherein the at least one first guide plate is provided with a plurality of first array through holes;
   at least one second guide plate, the at least one second guide plate located below and being parallel to the at least one first guide plate, wherein the at least one second guide plate is provided with a plurality of second array through holes, and the plurality of first array through holes correspond to the plurality of second array through holes;

at least one high-frequency test probe set, including:

at least one signal probe, the at least one signal probe correspondingly passing through one part of the plurality of first array through holes and one part of the plurality of second array through holes; and a plurality of grounding elements, the plurality of grounding elements arranged adjacent to the at least one signal probe and correspondingly passing through another part of the plurality of first array through holes and another part of the plurality of second array through holes, wherein the another part of the plurality of first array through holes through which the plurality of grounding elements pass are correspondingly adjacent to the one part of the plurality of first array through holes through which the at least one signal probe passes, and the another part of the plurality of second array through holes through which the plurality of grounding elements pass are correspondingly adjacent to the one part of the plurality of second array through holes through which the at least one signal probe passes, a shielding space defined by the plurality of grounding elements, wherein the shielding space surrounds the at least one signal probe, wherein a conductive trace is provided around the another part of the plurality of first array through holes or the another apart of the plurality of second array through holes through which the plurality of grounding elements pass, and at least one grounding point is formed between at least two of plurality of the grounding elements and the conductive trace, and the at least two of the plurality of grounding elements are electrically connected to each other through the conductive trace, wherein, the at least one signal probe is correspondingly not electrically connected to the plurality of grounding elements.

2. The probe card device according to claim 1, wherein the first guide plate has a first guide plate upper surface and a first guide plate lower surface, and the second guide plate has a second guide plate upper surface and a second guide plate lower surface;

wherein the at least one grounding point is formed on at least one of the first guide plate upper surface, the first guide plate lower surface, the second guide plate upper surface and the second guide plate lower surface.

3. The probe card device according to claim 1, wherein an insulation coating layer is disposed on at least one of the plurality of grounding elements.

4. The probe card device according to claim 3, wherein the insulation coating layer is correspondingly not in contact with the first guide plate and the second guide plate.

5. The probe card device according to claim 1, wherein the another part of the plurality of first array through holes through which the plurality of grounding elements pass are correspondingly adjacent to different sides of the one part of the plurality of first array through holes through which the at least one signal probe passes, and the another part of the plurality of second array through holes through which the plurality of grounding elements pass are correspondingly adjacent to different sides of the one part of the plurality of second array through holes through which the at least one signal probe passes.

6. The probe card device according to claim 5, wherein the plurality of grounding elements correspondingly pass through the first guide plate and the second guide plate along a first direction axis with respect to the signal probe.

7. The probe card device according to claim 6, wherein the plurality of grounding elements correspondingly pass through the first guide plate and the second guide plate along a second direction axis with respect to the signal probe.

8. The probe card device according to claim 7, wherein the first direction axis is not perpendicular to the second direction axis.

9. The probe card device according to claim 7, wherein the first direction axis is perpendicular to the second direction axis.

10. The probe card device according to claim 1, wherein the another part of the plurality of first array through holes through which the plurality of grounding elements pass are correspondingly diagonal to the one part of the plurality of first array through holes through which the at least one signal probe passes, and the another part of the plurality of second array through holes through which the plurality of grounding elements pass are correspondingly diagonal to the one part of the plurality of second array through holes through which the at least one signal probe passes.

11. The probe card device according to claim 10, wherein one part of the plurality of grounding elements correspondingly pass through the first guide plate and the second guide plate along a third direction axis with respect to the signal probe, and another part of the plurality of grounding elements correspondingly pass through the first guide plate and the second guide plate along a fourth direction axis with respect to the signal probe, wherein the third direction axis and the fourth direction axis are not parallel to each other and intersect at the at least one signal probe.

12. The probe card device according to claim 1, wherein the at least one grounding point includes at least one first grounding point formed on the first guide plate and at least one second grounding point formed on the second guide plate; wherein the first guide plate and the first grounding point are integrally formed, and the second guide plate and the second grounding point are integrally formed.

13. The probe card device according to claim 1, wherein, among the plurality of grounding elements defining the shielding space, only one of the plurality of grounding elements is used for grounding.

* * * * *